3,190,843
PROCESS OF MAKING A MODIFIED POLYVINYL ALCOHOL FOAM
Hans Höfelmann, Wiesbaden-Biebrich, Robert Braun, Wiesbaden, Karl Heinz Kahrs, Frankfurt am Main, Fritz Winkler, Kelkheim-Munster, and Wolfgang Zimmermann, Frankfurt am Main-Unterliederbach, Germany, assignors to Kalle Aktiengesellschaft, Wiesbaden-Biebrich, Germany, a corporation of Germany
No Drawing. Filed Mar. 13, 1961, Ser. No. 94,987
Claims priority, application Germany, Mar. 17, 1960, K 40,193
8 Claims. (Cl. 260—2.5)

The process of preparing synthetic sponges with valuable properties from polyvinyl alcohol in aqueous solution by foaming and reaction with formaldehyde under acid catalysis is already known. There have also been made attempts to modify polyvinyl formal foam by the introduction by condensation of organic nitrogen compounds containing at least one reactive hydrogen atom.

Besides many valuable properties, such as resistance to water, excellent capacity of water absorption and swelling, elasticity and resistance to wear and tear, these sponges also exhibit some disadvantages which are due to their chemical structure. Thus, in the same manner as all partially acetalised polyvinyl alcohols, they are sensitive to anion active detergents and acids and get hard and stiff upon drying.

In consequence thereof, these sponges become smeary, especially in the heat, because in relatively dilute aqueous solutions they absorb the detergents and swell up. Therefore, they are more rapidly used up and cannot be applied for many purposes. Due to the hardening during drying the sponges are often damaged. If the user of these sponges does not wait until they are completely sucked full when brought into contact with water and until they have softened, they crack and tear.

Many attempts were made to eliminate these drawbacks. For example, it has been proposed to improve the resistance to wetting agents of polyvinyl acetal sponges by aftertreatment with dialdehydes or acetals separating off dialdehydes. This process, however, is cumbersome and expensive. The addition of dialdehydes or substances separating off dialdehydes which cause cross-linking of the polymer chains under the reaction conditions existing during the manufacture of the sponges, at the time of foaming up the aqueous solution of polyvinyl alcohol, has likewise been taken into consideration. In both cases, the use of these additional reactants, especially of free dialdehydes such as glutaric aldehyde or α-hydroxy adipaldehyde, is not without danger, since these substances are highly irritating to the eyes and the skin. Moreover, too strong cross-linking with dialdehydes reduces the capacity of the polyvinyl acetal sponges of absorbing water.

In order to prevent the hardening of polyvinyl acetal sponges during drying it has been proposed to impregnate them with polyhydric alcohols or alcohol amines. Due to the water-solubility of such plasticisers, the latter are washed out during the use of the sponges and the intended effect is not permanent.

The present invention relates to a process for the manufacture of synthetic sponges from polyvinyl acetal, which do not have the above described disadvantages or to a very low degree only, and which are essentially improved with regard to their degree of softness and resistance to detergents.

Now, we have found that such improved synthetic sponges from polyvinyl acetal can be obtained when polyvinyl alcohols whose molecule is modified by introduction of acid groups or ester groups or by polyalkylene glycol groups, if required in admixture with non-modified polyvinyl alcohols, are subjected to foaming and acetalisation in an aqueous solution in the presence of strong acids.

The speed of the reaction of the modified polyvinyl alcohols of the invention with formaldehyde is almost the same as that with the commercial non-modified polyvinyl alcohols, so that no change of the reaction conditions which prevail during the manufacture of the sponges is required.

Polyvinyl alcohols which are modified by acid groups or ester groups, which are suitable for the process of the present invention, are preferably polyvinyl alcohols which contain carboxyl groups, sulfonic acid groups, or phosphonic acid groups, if required in esterified form. These modified polyvinyl alcohols are prepared in a manner as such known in the saponification of copolymers of vinylesters, especially of vinylacetate, with unsaturated compounds, for example maleic anhydride, crotonic acid, itaconic acid, maleic acid, fumaric acid, acrylic acid, methacrylic acid, vinylsulfonic acid, vinylphosphonic acid, or an ester of an acid containing the just-mentioned acid groups or functional groups thereof. A polyvinyl alcohol which is modified by carboxyl groups and which is suitable for the present invention can be obtained, for example, by dissolving 500 parts by weight of a copolymer of 97 percent by weight of vinyl acetate and 3 percent by weight of maleic acid diethyl ester, having a K-value of 65 (Fikentscher, Zellulosechemie, vol. 13, page 58, 1932) in 2000 parts by weight of methanol and intensively stirring for 4 hours after addition of 20 parts by weight of a methanolic sodium hydroxide solution of 15% strength, further adding 20 parts by weight of this sodium hydroxide solution, and distilling off the methyl acetate formed, while stirring. There is obtained a modified polyvinyl alcohol having a K-value of 75, which in addition to hydroxy and carboxy groups still contains about 10 percent of non-hydrolised vinyl ester groups, so that, as an example, the following groups may be present in the polymer molecule ($x$, $y$ and $z$ being whole numbers):

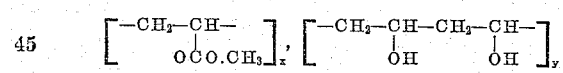

and

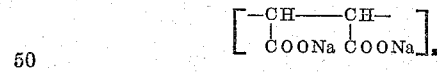

Valuable sponges may be obtained from modified polyvinyl alcohols derived from copolymers of vinyl acetate and an unsaturated copolymerisable acid or ester thereof, if the modified polyvinyl alcohol is composed of 1 to 30 percent by weight of vinyl acetate groups, 1 to 18 percent by weight of copolymerised acidic groups, calculated as free acid groups, and the percentage required to make 100 percent by weight of not esterified polyvinyl alcohol groups.

Under the conditions of the manufacture of the sponges, with strong mineral acids as catalyst, the carboxyl groups present in the form of sodium salts are liberated. The hydrolisation of the copolymers can, however, be so conducted, for example by saponification with catalytical quantities of sulfuric acid with or without addition of water, that the carboxyl groups are eventually either completely or partially present in the form of ester groups. This condition has no prejudicial influence on the quality of the synthetic sponges prepared according to the invention, since the carboxylic ester groups are hydrolized under the conditions of the manufacture of sponges and the finished sponge likewise contains reactive carboxylic groups.

The polyvinyl alcohols modified by polyalkylene glycol which are to be used in the process of the present invention are obtainable for example by hydrolysation of graft polymers of vinyl acetate onto polyalkylene oxides or their functional derivatives, or by hydroxalkylation, e.g., hydroxethylation of polyvinyl alcohol. The preparation of hydroxethylated polyvinyl alcohols is described, for example, in German Patent No. 575,141, and in U.S. Patent No. 2,844,570.

The polyvinyl alcohols modified according to the invention by polyalkylene glycol can be prepared from graft polymers of vinyl esters onto polyalkylene glycols or their functional derivatives, e.g., according to the processes described in Belgian Patents No. 579,240, No. 586,036, and No. 592,324. A polyvinyl alcohol of this kind may, e.g., correspond to the following formula:

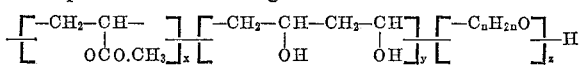

in which indicate:
$x = 1\text{--}30$ percent by weight
$z = 1\text{--}30$ percent by weight
$y = 100-(x+z)$ percent by weight Polyvinyl alcohols obtained by complete or partial hydrolysation of graft polymers of vinyl acetate onto polypropylene glycols of a molecular weight of 1000 up to 3000 were particularly advantageous. Another process comprises the steps of preparing copolymers of vinyl esters and diesters of unsaturated phosphonic acid, e.g., copolymers having from 0.1 to 20 percent by weight of such groups of diesters of unsaturated phosphonic acids, and partially or almost completely saponifying the copolymers in the presence or in the absence of water, in an alkaline or an acid medium.

Polyvinyl alcohols which contain acid or ester groups as well as polyethylene glycol in the polymer molecule are likewise suitable for the process of the present invention. It is in this manner possible to combine the effects obtained with regard to assistance to wetting agents and "inner" softening. Even hydroxalkylated amines or acid amides may be introduced into the polymer molecule of the modified polyvinyl alcohols to be used according to the invention.

The modified polyvinyl alcohols may be used either alone or in combination with each other or together with the conventional polyvinyl alcohols which may also contain acetyl groups. The behaviour with regard to foaming of carboxylic-groups-containing polyvinyl alcohols, which is in some cases slightly deteriorated, can thus be balanced in advantageous manner. The capacity of these alcohols of forming foam is, however, better, if the carboxylic-group-containing polyvinyl alcohols have undergone saponification to such a degree only that 10 to 20 percent by weight of vinyl ester groups are still present in the molecule.

It may be of advantage to use modified polyvinyl alcohols of medium up to high molecular weight, such of low molecular weight may, however, also be used simultaneously. If formaldehyde is used, it is added preferably in the form of an aqeuous solution. However, it may also be applied in polymeric or bound form, i.e. as hexamethylene-tetramine or polyhydroxy-methylene. As catalyst, there are used strong inorganic acids, such as sulfuric acid, hydrochloric acid, phosphoric acid, or nitric acid. Organic acids, such as trichloro acetic acid or organic sulfonic acids, are likewise suitable. It is preferred to maintain the concentration of the acid in the range of 4 to 40%, preferably 7 to 30%. The degree of concentration is in reciprocal proportion to the degree of temperature at which the reaction is carried out and which ranges between 20 and 70° C.

For stabilizing the foam the conventional wetting agents are used.

It has further been found that the improved synthetic sponges from polyvinyl acetal may also be obtained by the following modification of the process of the invention: The acetalisation of the aqueous polyvinyl alcohol solution foamed up is effected with the use of aldehydes containing acidic groups. Thereby are likewise formed polyvinyl acetals which are modified by acidic groups and which show improved properties as sponges. For this modified method, there are suitable, for example, glyoxylic acid, butyraldehyde sulfonic acid, benzaldehyde disulfonic acid, etc. They may be used alone or together with formaldehyde for the acetalisation. Above all, the polyvinyl acetals which contain sulfonic groups exhibit as sponges a capacity of swelling and water absorption which is the higher the more the polyvinyl acetal structure contains acidic groups.

It is known that the polyvinyl acetals, when used as synthetic sponges, must contain a maximum of about 40 to 50 percent, preferably 20 to 30 percent, of free OH-groups, calculated as vinyl alcohol, and that the preponderant proportion of hydroxyl groups must have undergone reaction with aldehyde, if a water-resistant sponge is to be produced.

The proportion of acidic groups in the molecule must not be too high. For example, by formalisation of a polyvinyl alcohol which contains 20 percent of crotonic acid in the molecule, there is obtained a polyvinyl formal foam without any strength.

With regard to the improvement of the synthetic sponges achieved by the present invention, especially the resistance to detergents is improved by the use of polyvinyl alcohols which contain carboxyl groups, sulfonic acid groups, or phosphonic acid groups. The resistance to strong mineral acids is likewise improved. These sponges produced according to the invention have also an improved capacity of swelling and water-retention as compared with sponges without carboxyl groups.

If the process of the present invention is started from polyvinyl alcohols obtained by hydrolisation of graft polymers of vinyl acetate onto polyalkylene oxides or their functional derivatives or by hydroxalkylation of polyvinyl alcohols, and these are reacted in known manner with formaldehyde, there are obtained sponges which show an essentially softer handle than sponges made from ordinary polyvinyl alcohol. This fact is combined with a considerably improved capacity of water-retention and high water swelling values, so that these products are drying out more slowly. The advantage of this "inner" softening of the polyvinyl acetal molecule according to the invention as compared to an external softening is that the softening agent cannot be washed out. In addition thereto, such graft polymers have often a better foaming capaicty than ordinary polyvinyl alcohols, which is also an improvement of the manufacturing process. The resistance to wetting agents of the sponges thus prepared is also good.

In addition to acid resistant dyestuffs, synthetic fibres or natural fibres as well as filling and abrasing agents of any kind may be incorporated with the sponge material. The materials obtained according to the present invention can advantageously be used as sponges in household and industry. They may, however, also be used as filtering medium of any kind or as ion-exchanger, or they may be used as carrier for abrading or polishing agents.

The following examples of reaction mixtures according to the invention for the manufacture of synthetic sponges serve to illustrate the process of the present invention. The ordinary polyvinyl alcohol foamed up in some cases, together with the other polyvinyl alcohol material, contains suitably from 7 to 15 percent of residual acetal groups.

*Example 1*

100 grams of an aqueous solution of about 20 percent strength of a modified polyvinyl alcohol prepared from a copolymer of 94% by weight of vinyl acetate and 6% by weight of vinyl phosphonic acid are foamed up to the desired volume together with 30 cc. of formaldehyde (about 30% strength) and addition of 2 cc. solution of a wetting agent and 15 cc. of sulfuric acid having a density of 1.36. The very stable foam is then poured into forms and allowed to undergo reaction which completes within a period of 6 to 100 hours, depending on the reaction temperature. The finished sponge material is discharged from the form, washed with water in order to remove acid, formaldehyde and wetting agents, and cut into pieces. The sponge material exhibits a high capacity of water retention and is suited as ion exchanger.

*Example 2*

100 grams of an aqueous solution of about 18.5% strength of a modified polyvinyl alcohol prepared from a copolymer of 96 parts by weight of vinyl acetate and 4 parts by weight of itaconic acid methyl ester are foamed up to a maximum volume together with 27 cc. of formaldehyde (30% strength), with the addition of 2 cc. of a solution of a wetting agent and 42 cc. of sulfuric acid of 45% strength, and then worked up as described in Example 1. The sponge material thus obtained exhibits a very good resistance to acids and wetting agents.

*Example 3*

The mixture of 100 grams of a solution of 19% strength of a modified polyvinyl alcohol prepared from a copolymer of 95 parts by weight of vinyl acetate and 5 parts by weight of crotonic acid, and 70 grams of a solution of likewise about 19% strength of an ordinary polyvinyl alcohol are foamed up to a maximum volume in the presence of 50 cc. of formaldehyde (30% strength), 1 cc. of a dilute solution of a wetting agent, and 78 cc. of a sulfuric acid of 40% strength, and further treated in the manner described in Example 1. The sponge material so produced has properties similar to those of the aforementioned products.

*Example 4*

By foaming up to the desired volume 100 grams of a solution of 20% strength of a modified polyvinyl alcohol into which were polymerized 4% by weight of maleic acid, together with 28 cc. of formaldehyde (30% strength) in the presence of 2 cc. of a solution of a wetting agent and 40 cc. of sulfuric acid having a density of 1.39, there is obtained, after completed reaction and usual purification, a sponge material exhibiting a very good resistance to acids and wetting agents. In order to promote the capacity of being foamed up there may be added up to 80 cc. of water. The sponge product which contains carboxylic groups may also be used as an ion exchanger.

*Example 5*

A sponge possessing excellent properties is obtained by foaming up to maximum volume 100 grams of a solution of 20% strength of a modified polyvinyl alcohol obtained from a graft copolymer of 88% by weight of vinyl acetate, 9% by weight of polypropylene glycol (molecular weight 1000 to 3000) and 3% by weight of maleic acid diethyl ester, together with 24 cc. of formaldehyde (30% strength), 2 cc. of a dilute solution of a wetting agent, and 40 cc. of sulfuric acid of 45% strength and allowing the whole to react under the usual conditions with regard to temperature and time. The synthetic sponge thus prepared has the same properties as those of the sponges described in the preceding examples.

*Example 6*

100 grams of a solution of 15% strength of a modified polyvinyl alcohol prepared from a graft polymer of vinyl acetate onto polypropylene glycol (molecular weight 2000), together with 22 cc. of formaldehyde (30% strength) with addition of 1 cc. of a solution of a wetting agent and 30 cc. of strong hydrochloric acid, were foamed up to the desired volume. The foam thus formed is poured into forms and allowed to react. After purification there are obtained sponges of very soft handle, high water-retention, and very good stability. The softness of the sponge increases with the proportion of graft polypropylene glycol.

(a) In the first case, the polyvinyl alcohol contains about 10% by weight of graft polypropylene glycol.

(b) In the second case, the polyvinyl alcohol contains about 5% by weight of polypropylene glycol.

*Example 7*

A starting solution possessing an excellent capacity for being foamed up is prepared by mixing a solution of 10% strength of ordinary polyvinyl alcohol with a solution of likewise 10% strength of modified polyvinyl alcohol in the ratio of 7:3. The modified polyvinyl alcohol was prepared from a graft polymer of vinyl acetate and polyethylene glycol (molecular weight 25,000) and contained about 26% by weight of graft polyethylene glycol.

200 grams of this starting solution of 10% strength are foamed up to the desired volume in the presence of 54 cc. of formaldehyde (30% strength), 2 cc. of a solution of a wetting agent, and 40 cc. of sulfuric acid of 45% strength. The foam is filled into forms and allowed to react. It is then washed. The sponge thus prepared is agreeably soft and is distinguished by a high degree of water retention.

*Example 8*

The mixture of 100 grams of the solution of 20% strength of the modified polyvinyl alcohol described in Example 1, into which are polymerized 6% of vinyl phosphonic acid, together with the same quantity of the solution of 15% strength of the modified polyvinyl alcohol described in Example 6, especially the type indicated under (a), is foamed up in the presence of 54 cc. of formaldehyde, 3 cc. of a solution of a wetting agent, and 95 cc. of a sulphuric acid having a density of 1.30 and thus caused to react. The foam is treated in the manner described in Example 1. This combination of the modified polyvinyl alcohols yields a sponge which exhibits a high degree of softness and good resistance to wetting agents.

*Example 9*

100 grams of a solution of 15.5% strength of the modified polyvinyl alcohol indicated in Example 2 were foamed up to the desired volume after addition of 18 cc. of formaldehyde, 2 cc. of a solution of a wetting agent, 3 grams of the sodium salt of benzaldehyde disulfonic acid, and 22.5 cc. of sulfuric acid having a density of 1.3. After transfer into forms the foam is allowed to react and washed after completed reaction. The sponge thus obtained exhibits an improved resistance to acids in addition to a high degree of swelling capacity.

*Example 10*

As modified polyvinyl alcohols according to the invention there are also suitable the products obtained by partial acetalisation of polyvinyl alcohol by the action of aldehyde sulfonic acid or aldehyde carboxylic acid. 40 grams of a solution of about 21% strength of a polyvinyl butyralsulfonate still containing free OH-groups are foamed up together with 390 grams of the solution of the modified polyvinyl alcohol described in Example 5, or with the same quantity of an ordinary polyvinyl alcohol, after addition of 96 cc. of formaldehyde (30% strength) and 86 cc. of a sulfuric acid having a density of 1.3. This very well foaming reaction mixture is filled into forms. After completed reaction the washed sponge thus obtained exhibits a high degree of resistance to acids and wetting agents.

The modified polyvinyl alcohols used in Examples 1 to 10 contain from about 0.5 to 35 percent by weight of residual acetate groups.

As an example, the solution of a wetting agent used in the Examples 1 to 9 may be a 1 percent by weight solution of a sulfonate of a fatty alcohol, e.g., of cetyl alcohol.

What is claimed is:

1. A process for the preparation of a sponge material which comprises reacting at a temperature between 20 and 70° C. in the presence of an acid catalyst
   (a) at least one aldehyde selected from the group consisting of formaldehyde and an acidic aldehyde said acidic aldehyde being selected from the group consisting of glyoxylic acid, butyraldehyde sulfonic acid and benzaldehyde disulfonic acid and
   (b) a foamed aqueous solution comprising hydrolyzed polyvinyl acetate which has been reacted with a compound selected from the group consisting of (A) polyethylene glycol, (B) polypropylene glycol and (C) a monomer selected from the group consisting of maleic, crotonic, itaconic, fumaric, acrylic, methacrylic, vinyl sulfonic, vinylphosphonic acids, and alkylesters of said acids wherein the alkyl group contains from 1–2 carbon atoms.

2. The process according to claim 1 wherein said polyvinyl acetate is a copolymer of 94 parts by weight vinyl acetate and 6 parts by weight vinyl phosphonic acid.

3. The process according to claim 1 wherein said hydrolyzed polyvinyl acetate is obtained by the incomplete hydrolysis of a graft copolymer of vinyl acetate and a polyalkylene glycol.

4. The process according to claim 3 wherein graft copolymer is a graft copolymer of from 74 to 95 parts by weight vinyl acetate and 26 to 5 parts by weight polyalkylene glycol.

5. The process according to claim 1 wherein the foamed aqueous solution of the hydrolyzed polyvinyl acetate reacted with the aldehyde contains an additional amount of polyvinyl alcohol.

6. A sponge product produced by the process of claim 1.

7. A sponge product produced by the process of claim 2.

8. A sponge product produced by the process of claim 4.

References Cited by the Examiner
UNITED STATES PATENTS

| | | | |
|---|---|---|---|
| 2,399,456 | 4/46 | Yates et al. | 260—73 |
| 2,664,366 | 12/53 | Wilson | 260—2.5 |
| 2,664,367 | 12/53 | Wilson | 260—2.5 |
| 2,668,153 | 2/54 | Hammon | 260—2.5 |
| 2,844,570 | 7/58 | Broderick | 260—91.3 |

MURRAY TILLMAN, *Primary Examiner.*

LEON J. BERCOVITZ, *Examiner.*